(12) United States Patent
Whiteley et al.

(10) Patent No.: US 11,131,402 B2
(45) Date of Patent: Sep. 28, 2021

(54) VALVE HANDLE LOCKING MECHANISM

(71) Applicant: PEGLER YORKSHIRE GROUP LIMITED, Doncaster (GB)

(72) Inventors: Paul Nicholas Whiteley, Doncaster (GB); Steve Currid, Mirfield (GB)

(73) Assignee: AALBERTS INTEGRATED PIPING SYSTEMS LIMITED, Doncaster (GB)

( * ) Notice: Subject to any disclaimer, the term of this patent is extended or adjusted under 35 U.S.C. 154(b) by 0 days.

(21) Appl. No.: 16/644,752

(22) PCT Filed: Sep. 6, 2018

(86) PCT No.: PCT/GB2018/052518
§ 371 (c)(1),
(2) Date: Mar. 5, 2020

(87) PCT Pub. No.: WO2019/048856
PCT Pub. Date: Mar. 14, 2019

(65) Prior Publication Data
US 2020/0263807 A1    Aug. 20, 2020

(30) Foreign Application Priority Data

Sep. 7, 2017    (GB) ..................................... 1714382

(51) Int. Cl.
*F16K 35/02*    (2006.01)
*F16K 35/06*    (2006.01)
(52) U.S. Cl.
CPC ............ *F16K 35/02* (2013.01); *F16K 35/025* (2013.01); *F16K 35/06* (2013.01)

(58) Field of Classification Search
CPC ......... F16K 35/025; F16K 35/06; F16K 35/02
(Continued)

(56) References Cited

U.S. PATENT DOCUMENTS

| 951,878 A | * | 3/1910 | Dolan | ................... F16K 35/025 |
| | | | | 251/105 |
| 1,967,309 A | * | 7/1934 | Hume | ................... B60T 17/043 |
| | | | | 251/110 |

(Continued)

FOREIGN PATENT DOCUMENTS

| CN | 201739548 U | 2/2011 |
| DE | 202014105683 U1 | 12/2014 |

(Continued)

OTHER PUBLICATIONS

International Search Report and Written Opinion for corresponding PCT application No. PCT/GB2018/052518, dated Dec. 10, 2018.
(Continued)

*Primary Examiner* — Kevin F Murphy
(74) *Attorney, Agent, or Firm* — Notaro, Michalos & Zaccaria P.C.

(57) ABSTRACT

A locking mechanism for a valve handle has a slider arranged to slide back and forth in a slot in the valve handle, between a lock position, in which the slider engages with a stop on the valve body and an unlock position, in which the slider does not engage with a stop. The slider is formed in two parts, which are inserted from opposite sides of the slot and snap fit together. The slider has indicia to indicate whether the slider is in the lock or unlock position, and the slider is arranged so as to cover the fastener which attaches the valve handle to the valve body.

12 Claims, 5 Drawing Sheets

(58) Field of Classification Search
USPC .............. 251/101, 102, 104, 105, 106, 110
See application file for complete search history.

(56) References Cited

U.S. PATENT DOCUMENTS

| | | | | |
|---|---|---|---|---|
| 2,838,270 A | * | 6/1958 | Danielson | G05G 1/10 |
| | | | | 251/110 |
| 2,912,218 A | | 11/1959 | Stillwagon | |
| 3,421,653 A | * | 1/1969 | Whaley | B65D 43/0208 |
| | | | | 220/780 |
| 3,648,970 A | * | 3/1972 | Hartmann | F16K 35/06 |
| | | | | 251/104 |
| 3,858,989 A | * | 1/1975 | Field | F16B 7/18 |
| | | | | 403/171 |
| 4,770,388 A | | 9/1988 | Carman | |
| 4,890,506 A | * | 1/1990 | Muller | F16K 35/025 |
| | | | | 251/102 |
| 5,183,073 A | | 2/1993 | Roberts | |
| 5,213,308 A | * | 5/1993 | Jeromson | F16K 35/04 |
| | | | | 137/385 |
| 5,363,880 A | * | 11/1994 | Hsieh | F16K 31/605 |
| | | | | 137/625.17 |
| 5,709,112 A | * | 1/1998 | Kennedy | F16K 35/025 |
| | | | | 137/385 |
| 5,762,317 A | * | 6/1998 | Frahm | F16K 35/025 |
| | | | | 222/505 |
| 5,971,354 A | * | 10/1999 | Ecklund | F16K 35/025 |
| | | | | 251/104 |
| 6,361,017 B1 | * | 3/2002 | Nimberger | F16K 35/06 |
| | | | | 137/382.5 |
| 8,740,180 B2 | * | 6/2014 | Matsushita | F16K 35/06 |
| | | | | 251/109 |
| 2016/0341332 A1 | | 11/2016 | Iwanaga et al. | |

FOREIGN PATENT DOCUMENTS

| | | |
|---|---|---|
| DE | 202015003801 U1 | 7/2015 |
| EP | 1373771 B1 | 4/2007 |
| EP | 2264346 B2 | 8/2016 |
| WO | 2015057610 A1 | 4/2015 |

OTHER PUBLICATIONS

European examination report for corresponding European patent application No. EP 18786008.5, dated Feb. 12, 2021.

* cited by examiner

VALVE HANDLE LOCKING MECHANISM

TECHNICAL FIELD OF THE INVENTION

The present invention relates to a valve handle locking mechanism and valves and handles incorporating such mechanisms.

BACKGROUND TO THE INVENTION

Valves, and especially ball valves, typically have stops for controlling the handle between fully opened and fully closed positions while still allowing intermediate positions if desired. In some, but not all, applications, a valve is left in one of a fully opened or a fully closed position. In most installations, it is undesirable to inadvertently change the selected fully open or fully closed position. However, in some installations it is desirable to frequently change the position of the valve, and to use partially open/closed positions. Prevention of inadvertent movement of a valve between these positions can be accomplished in a number of ways, including, for example, valve locks.

One example of a valve locking mechanism is disclosed in WO2015/057610. WO2015/0567610 discloses a locking collar which slideably fits over the control handle of a valve, such as a ball valve, and can be moved to locking and unlocking positions. The collar includes a pair of fork-like tines which are spaced apart to span a stop member on the valve body. One of the tines includes a tab with a threaded aperture for receiving a threaded adjustment screw. When tightened against the stop member, the screw secures the locking collar and, therefore, the valve handle in a fixed position, preventing inadvertent changing of the valve position. An aperture in the handle allows a lock to be inserted through the handle preventing movement of the locking collar to prevent changing of the valve position by unauthorized tampering.

This mechanism is effective, but suffers certain disadvantages. For example, the handle has to be specially formed, with an aperture in, to receive the bail of a padlock.

Additionally, the locking collar is arranged on a downwardly inclined section of the handle, so it is urged (by gravity) towards the locked position, making one-handed operation of the valve difficult (since the collar needs to be held away from the locked position and the handle turned simultaneously). One handed operation is of course desirable, since the other hand is likely to be holding the padlock that will be used to lock the valve in position. This can also be irritating if the handle is to be moved frequently.

Moreover, the provision of a separate collar on the outside of the handle is unsightly and has the potential to pinch a user's fingers during operation (especially if attempting to carry out a one-handed operation).

The present invention aims to provide an improved valve handle locking mechanism.

SUMMARY OF THE INVENTION

According to a first aspect of the invention, there is provided a locking mechanism for a valve handle, the locking mechanism comprising a slider arranged to slide back and forth in a slot in the valve handle, between a lock position, in which the slider engages with a stop on the valve body and an unlock position, in which the slider does not engage with a stop.

This solution is less likely to cause pinching and can more easily be operated one-handed. Additionally, since the movement is largely internal (i.e. within a slot) the mechanism is less susceptible to dirt and detritus which could negatively impact smoothness of movement.

More than one stop (engagable by the slider) may of course be provided. For example, two stops may be provided, one corresponding with the fully closed position of the valve and one corresponding to the fully open position of the valve (as these are the positions at which it is most likely that a user will wish to lock the handle).

The slider may be arranged to slide through the slot and on one side of the slot may comprise an engagement means, for example a pair of spaced apart tines, for engaging with the stop on the valve body.

The slider may comprise a padlock receiving means, such as an aperture at the opposite end from the engagement means, thus the padlock receiving means may be arranged on the opposite side of the slot from the engagement means. The padlock receiving means may be arranged to be accessible when the slider is in the lock position and inaccessible when the slider is in the unlock position.

The aperture (or indeed another aperture in the slider at the opposite end from the engagement means) may be threaded, or partially threaded, so as to receive a correspondingly threaded fastener. Optionally the locking mechanism may comprise such a threaded fastener.

The slider may comprise a grip.

The grip may be sized and/or shaped such that it cannot be pulled through the slot—this prevents the slider from being removed. Similarly, the engagement means on the slider may be sized and/or shaped such that it cannot be pulled through the slot. In this way, permanent connection of the slider (in the sense that it cannot be removed without breaking it) can be achieved.

The locking mechanism may comprise a retention mechanism to retain the slider in the lock position and to retain the slider in the unlock position.

This is advantageous in terms of allowing one-handed use, as the slider will be retained in the unlock position, not urged back towards the lock position. Moreover, the retention mechanism can provide positive tactile feedback to a user, indicating that the lock position, or unlock position has been reached, and can prevent the slider moving under vibration or its own weight.

As set out above, in many environments, it may be necessary to lock the valve in position to prevent inadvertent movement. However, there may be significant periods of time during which it is desired that the valve is unlocked to allow straightforward movement. At such times, it may be desired that the locking mechanism is in the unlock position, so as to allow instantaneous movement of the valve handle, or for the locking mechanism to be in the lock position, to prevent inadvertent movement, but allow movement relatively quickly, without having to remove a padlock. The provision of a retention mechanism to retain the slider in either the lock position or the unlock position allows for both of these possibilities, offering greater flexibility to the user.

With the option of a partial thread in the padlock receiving means, yet another level of security/flexibility is obtained, such that the slider can be held in the lock position, and only moved to the unlock position with a certain amount of forethought and effort (i.e. obtaining a suitable screwdriver or the like to remove the threaded fastener), but without the need to access a key.

The retention mechanism may comprise a resilient (or resiliently mounted) projection on the slider engageable with a corresponding depression in the handle or valve body. Alternatively, the retention mechanism may comprise a resilient depression on the slider engageable with a corresponding projection in the handle or valve body. Or indeed, the retention mechanism could comprise a depression on the slider engageable with a corresponding resilient (or resiliently mounted) projection in the handle or valve body. Finally in terms of these possibilities, the retention mechanism could comprise a projection on the slider engageable with a corresponding depression in the handle or valve body.

The handle may be provided with a viewing window, through which a part of the slider in the slot can be viewed. The slider may be provided with indicia indicating whether it is in the lock or unlock position. The indicia indicating it is in a lock position may be visible through the window when it is in the lock position and indicia indicating it is in the unlock lock position is visible through the window when it is in the unlock position. This allows an easy and rapid understanding of whether the handle is locked or unlocked.

The indicia may have a common part visible in both the lock and unlock position. This can allow for larger indicia to be used, since the entirety of one indication need not be obscured when the other becomes visible.

The handle may have an elongate lever and the slot may extend in the same longitudinal direction as the longitudinal axis of the lever. The engagement means may be arranged on the same side of the slot as the lever, whereas the grip and/or the padlock receiving means may be arranged on the opposite side to the lever.

The slot may be arranged to extend through an attachment portion of the handle, where it is attached to the valve. Attachment may be by way of a fastener having a long axis, e.g. a threaded fastener, extending through a coaxial bore through the attachment portion and the slot may be arranged axially outwardly of the fastener. Thereby, with the slider inserted, access to the fastener is prevented.

This adds a further layer of tamper prevention, when the valve is padlocked in the lock position.

The slider may be formed in at least a first part and a second part, the two parts being assembled from opposite sides of the slot The two parts may be connected by means of a snap fit. This makes assembly particularly straightforward.

The first part may comprise the engagement means and the first part may be formed of metal, or another strong material.

The first part may extend through the slot and may be provided with padlock receiving means on the opposite side of the slot from the engagement means.

The second part may comprise the grip and/or the indicia and may be formed of a resilient material, optionally a more comfortable less heat-conductive material, such as a plastics material, which may be weaker than the material of the first part.

The second part may comprise the part of the retention mechanism. In particular, the second part may comprise a resilient projection on the slider engageable with a corresponding depression in the handle or valve body.

The second part may comprise the thread, or partial thread, for receiving a threaded fastener.

This two-part arrangement, especially when using different materials, such as a plastic and a metal can thus achieve a number of improvements over the prior art, drawing on the various benefits of the materials, such as the resilience of the plastic part, which allows it to snap fit to the metal part simplifying assembly and avoiding the need for glue, to envelope the metal part where strength is required, and to project from the metal part where resilience in use is required.

In a particular embodiment, the second part may envelope the first part in the region of the grip, the indicia and the padlock receiving means (and where the padlock receiving means is an aperture in the first part, may have a corresponding aperture to allow access to the aperture through the first part), but it may project away from the first part (for example, beyond an axial end of the first part) in the region of the retention mechanism.

Of course, the invention extends to a valve having a valve body comprising one or more stops and a valve handle and comprising the locking mechanism as set out above.

In particular, the valve may be a ball valve.

According to a second aspect of the invention, there is provided a method of providing a locking mechanism for a valve handle, method comprising inserting a slider through a slot in the valve handle, such that it is arranged to slide back and forth in the slot between a lock position, in which the slider engages with a stop on the valve body and an unlock position, in which the slider does not engage with a stop.

Preferably the method comprises inserting a slider comprising at least two parts into the slot.

More preferably, the method comprises inserting one part of the slider into the slot from one side and the other part of the slider into the slot from the other side.

More preferably still, the method comprises inserting one part of the slider into the slot from one side and the other part of the slider into the slot from the other side, such that they connect together by snap-fitting.

The locking mechanism of the second aspect of the invention may be the locking mechanism as defined in the first aspect of the invention, including any optional features.

DETAILED DESCRIPTION OF THE INVENTION

In order that the invention may be more clearly understood an embodiment thereof will now be described, by way of example only, with reference to the accompanying drawings, of which:

Figure 1:
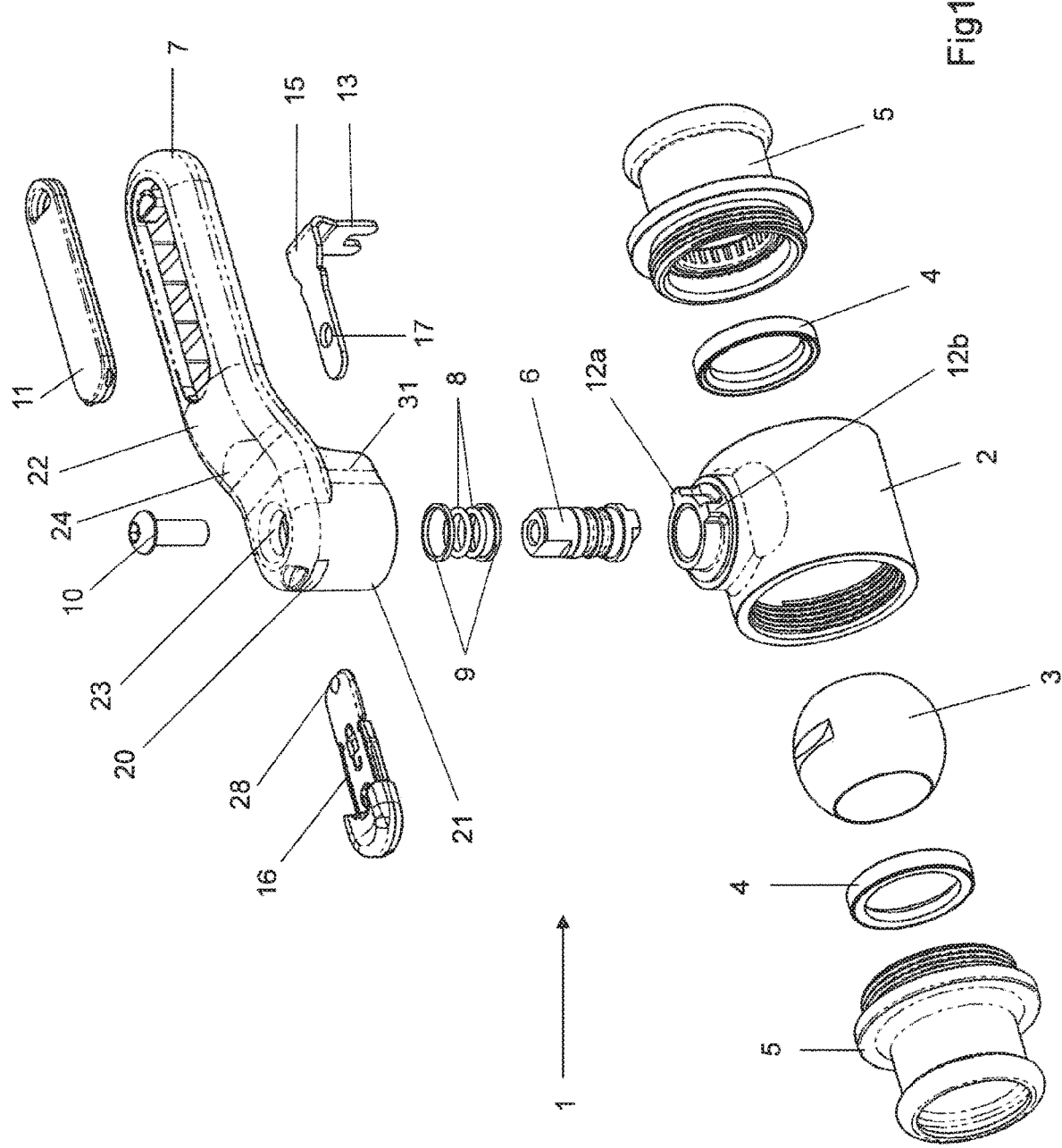
FIG. 1 shows an exploded perspective view of a ball valve comprising a locking mechanism.
Figure 2:
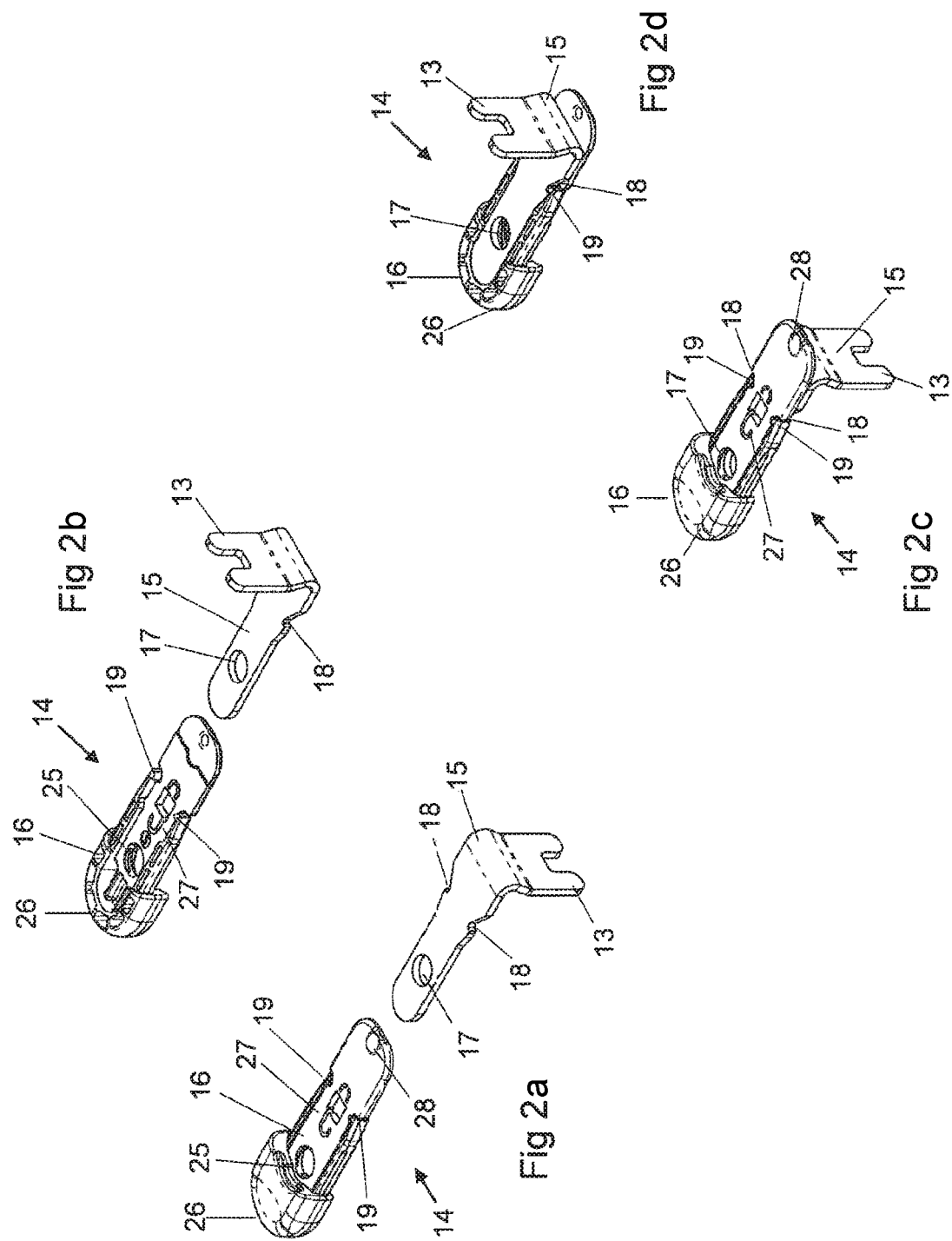
FIGS. 2a-2c show the slider of the locking mechanism of FIG. 1, with FIG. 2a showing an exploded perspective view, FIG. 2b showing an exploded underneath perspective view, FIG. 2c showing a perspective view and FIG. 2d showing an underneath perspective view.

With reference to the drawings, a valve 1 is shown. In this case as can be seen from FIG. 1, the valve 1 is a ball valve, comprising a valve body 2, a ball 3, seals/spacers 4 and connectors 5 for connection to pipework (not shown).

A spigot 6 connects the ball 3 to an elongate handle 7, with seals 8 and spacers 9 provided between the spigot 6, the valve body 2 and the handle 7 to avoid leaks. The handle 7 is attached to the spigot 6 by a threaded fastener 10. An insert is provided in the handle 7 (along its longitudinal axis) to allow for detail, such as branding, and/or colour.

It will be appreciated, however, that the detail of the valve 1 is largely irrelevant, as the invention concerns the locking mechanism for the handle 7 (which can be used to prevent inadvertent opening/closing of the valve).

The locking mechanism for the valve handle 7 includes stops 12a, 12b formed on the valve body at a right angle to one another, so as to correspond in the fully open and fully closed positions of the valve 1. The stops 12a, 12b extend from the (upper) surface of the valve body 2, beneath the handle 7.

The stops 12a, 12b are arranged to engage with engagement means 13 in the form of a pair of fork-like downwardly depending spaced apart tines of a slider 14. The slider 14 is formed of a first part 15 and a second part 16, which are shown in detail in FIGS. 2a to 2d and snap-fit together.

The first part 15 provides strength to the slider and it is this part which comprises the engagement means 13. It is formed from metal, for example steel or aluminium, for example by stamping a shaped strip from sheet metal and bending it. The strip is shaped to form the tines of the engagement means 13 and bent such that these tines depend downwardly at a first end of the strip. An aperture 17 is punched through the first part near the opposite end of the first part 15. The aperture 17 is sized to receive the bail of a padlock (not shown).

Between the engagement means 13 and the aperture 17 on each of the long sides of the strip, notches 18 are formed to receive corresponding resiliently laterally inwardly biased teeth 19 arranged on the underside of the second part 16 of the slider 14, such that the first part 15 and the second part 16 snap fit together.

The two parts 15, 16 of the slider are connected together with a slot 20 extending through the handle 7 in the region where it is connected to the valve body 2 (so as to engage the stops 12a, 12b).

In particular, the handle 7 of this embodiment has a substantially cylindrical attachment portion 21 (for attachment to the spigot 6 and hence the ball 3), and an integrally formed elongate lever 22, for the user to grip and turn. An intermediate upwardly inclined portion 24 of the handle 7 extends between the lever and the attachment portion. The slot 20 extends through the attachment portion 21 near the top of the handle 7, but just below the lever 22. It extends in the same longitudinal direction as the axis of the lever 22.

A deeply countersunk bore 23 is provided through the attachment portion coaxially with the spigot, such that the head of the threaded fastener 10 sits at the bottom of the deeply countersunk part of the bore 23. The slot 20 is arranged axially outwardly of (above) the head of the threaded fastener 10, but axially inwardly of (below) the lever 22 as set out above. Wings 31 are provided in the attachment portion extending in the direction of the longitudinal axis of the lever 22, below the upwardly inclined portion 24 of the handle 7. These wings 31 extend either side of the slider 14, so as to shield it (reducing the chance of dirt or detritus entering the mechanism, or a user trapping fingers).

Figure 5:
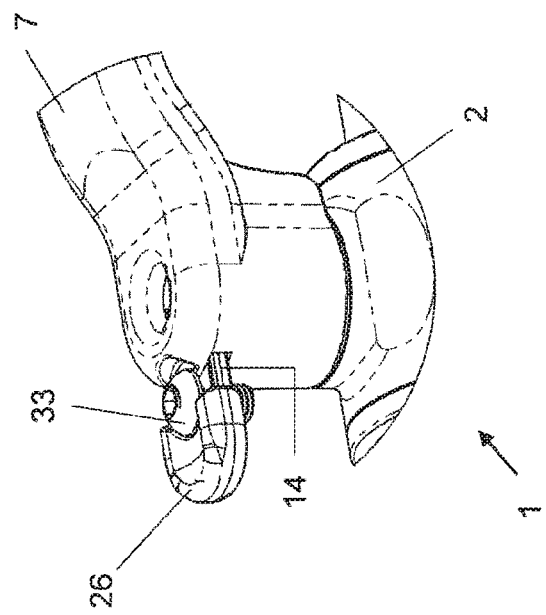
FIG. 5 shows a close-up perspective view of part of the slider in the region of the aperture in the locking mechanism of FIG. 1.
Figure 6:
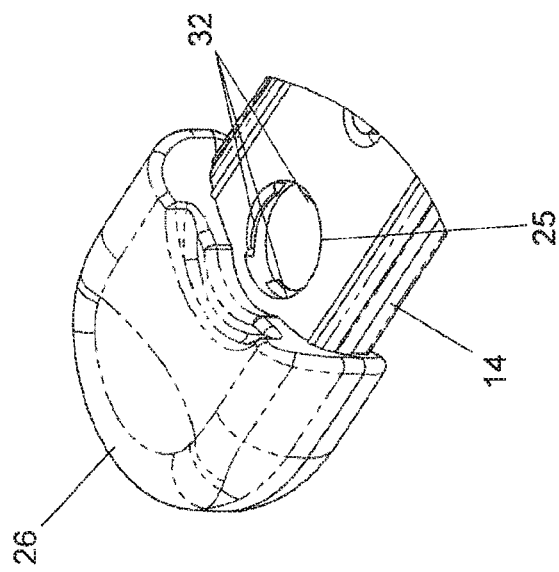
FIG. 6 shows a partial perspective view of the locking mechanism of FIG. 1 with a threaded fastener provided in the aperture.

The second part 16 of the slider 14 (best seen in FIGS. 2a-2d) is formed of a resilient material, such as a plastics material, suitably by injection moulding. As with the first part 15, it is substantially strip-shaped. The second part 16 is arranged to sit on top of the first part 15 when snap-fitted thereto, and has an aperture 25 corresponding to the aperture 17 through the first part. The aperture 25 is formed to provide a partial thread 32, best seen in FIG. 5, so as to receive a correspondingly threaded fastener 33, best seen in FIG. 6.

Outwardly (of the slot and) of the aperture 25, a grip 26 is provided. This grip 26 provides a comfortable part for a user to grab, in order to reciprocate the slider 14 back and forth in the slot 20. The grip 26 is deeper than the remainder of the second part 16 of the slider 14, and whilst the slot 20 is sized to allow the slider 14 to reciprocate therein (being slightly taller than the combined depth of the first and second parts), it is shorter than the depth of the grip 26, to avoid the slider 14 being pushed right into or through the slot 20.

Of course, at the opposite end of the slot 20, the downwardly depending engagement portion 13 of the slider 14 prevents the slider being pulled right into or through the slot 20.

Indicia 27 is provided on the upper surface of the slider 14, in this embodiment by means of a cutout through the second part 16 of the slider 14, by way of which the upper surface of the first part 15 of the slider 14 is visible. The indicia 27 is arranged to be visible through the countersunk part of the bore 23 through the attachment part of the handle 7, such that the countersunk part of the bore 23 acts as a viewing window.

The indicia 27 in this embodiment forms an image of the body of a padlock, which can be seen whether the slider 14 is in the lock or unlock position, with an open hasp at one end and a closed hasp shown at the other end of the body of the padlock. The images of the hasps are arranged such that the open hasp is visible, but the closed hasp obscured when the slider 14 is in the unlock position and vice versa in the lock position.

The second part 16 of the slider 14 is longer than the first part 15 and in addition to extending slightly beyond the end of the first part 15 of the slider 14 in the region of the grip 26, it extends beyond the opposite end, where the engagement portion 13 depends downwardly. Since it is formed from a resilient material, it is able to bend in this region where it is not atop the first part 15. In its natural state, the second part 16 continues straight beyond the end of the first part 15. However, it is capable of bending downwards, and is provided, at its end, with an upwardly extending projection 28, in this embodiment a part-spherical lump or protuberance.

Figure 3:
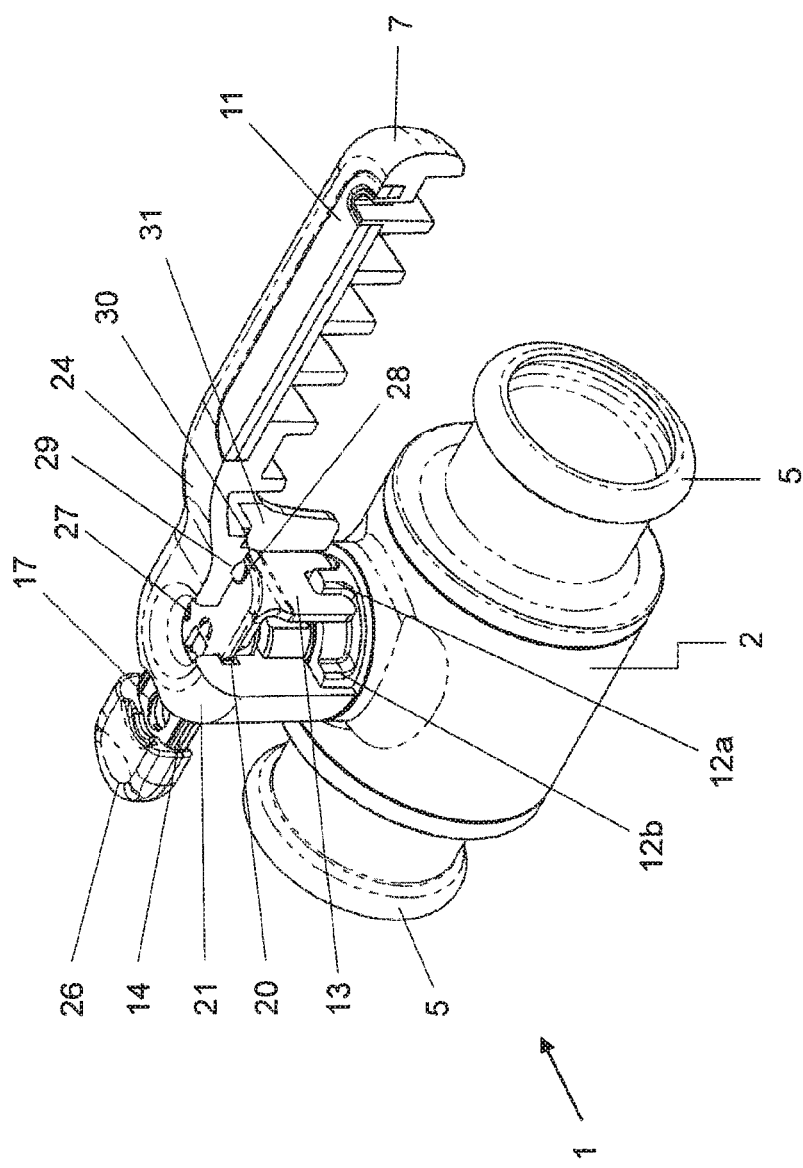
FIG. 3 shows a part-cutaway perspective view of the ball valve of FIG. 1 with the locking mechanism in the lock position.
Figure 4:
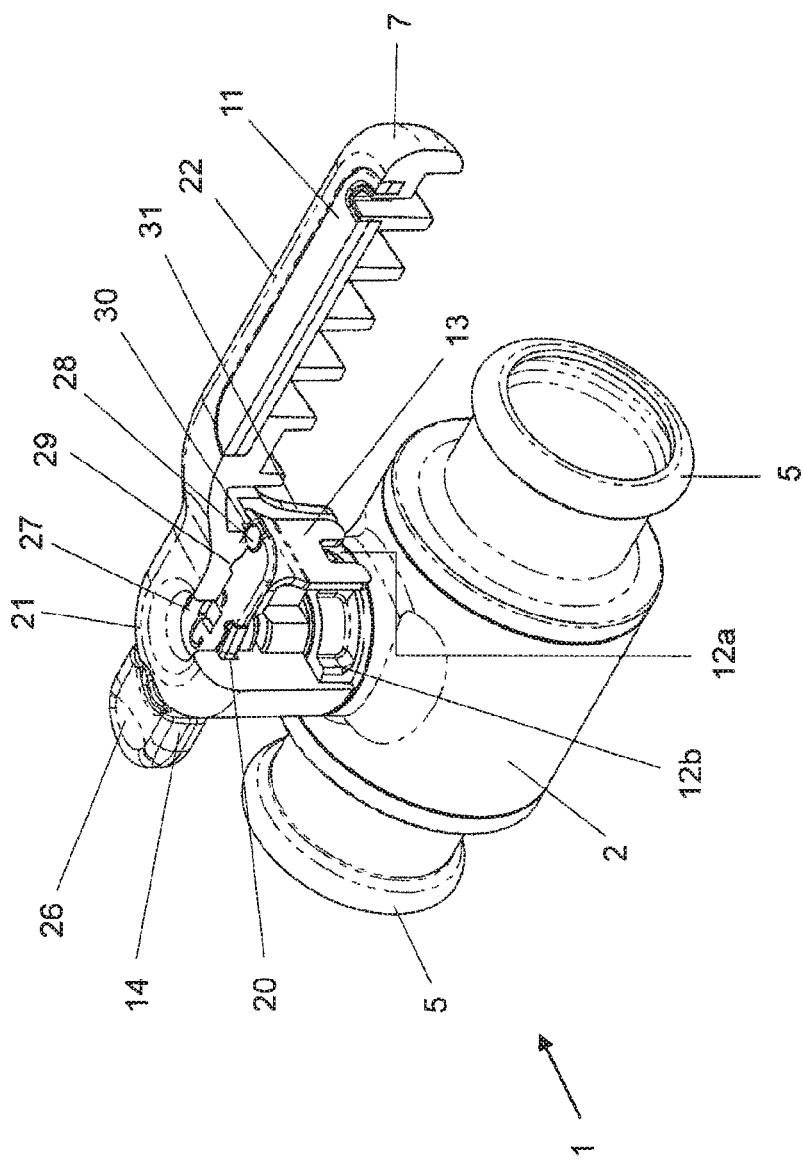
FIG. 4 shows a part-cutaway perspective view of the ball valve of FIG. 1 with the locking mechanism in the unlock position.

The resilient projection 28 cooperates with first and second depressions 29, 30, visible in FIGS. 3 and 4 formed in the underside of the handle 7 (in this embodiment in the region of the intermediate portion 24, between the generally cylindrical attachment portion 21 and the lever 22).

The co-operation is such that the resilient projection 28 engages with the first depression 29 (which is arranged radially closer to the axis of the cylindrical portion 21) when the slider 14 is in the lock position and the resilient projection 28 engages with the second depression 30 (which is arranged radially further from the axis of the cylindrical portion 21) when the slider 14 is in the unlock position. Thus, the projection 28 and the depressions 29, 30 constitute a retention mechanism to retain the slider 14 in the lock position and to retain the slider 14 in the unlock position. This provides a tactile response to the user, indicating that the unlock/lock position has been reached, and prevents rattling and/or accidental movement of the slider 14 due for example to vibrations, or just under its own weight, in the event that the slider 14 is not arranged horizontally.

Throughout this specific description, the terms up/down etc. have been used with reference to the direction shown in the image, but those skilled in the art will appreciate that valves 1 can be arranged at various angles on pipes, and, for example, may be arranged on vertically extending pipes, which would completely alter the references (and lead to a situation as set out above, where the weight of the slider 14 could urge it towards one position or the other, were it not for the retention means). Clearly, the terms up/down etc. are used not in a limiting sense, but for the sake of specifically describing the one specific embodiment in an arrangement shown.

As alluded to above, the slider 14 can be reciprocated between a lock position and an unlock position. The lock position is shown in FIG. 3. In this arrangement, the grip 26 is pulled out away from the slot 20, this pulls the part of the slider 14 in which the aperture 17 is formed out of the slot 20, pulls the part of the indicia 27 showing the closed hasp of the padlock into the viewing window, obscuring the unlocked hasp, and most importantly brings the engagement means 13 into engagement with the stop 12a or 12b (depending on the position of the handle 7), such that the tines are arranged either side of the stop 12a, 12b and movement of the handle 7 is restricted.

In this position, if desired, the hasp of a padlock (not shown) can be put through the aperture 17 and closed to prevent the slider 14 from being pushed back through the slot 20 to disengage the engagement means 13 from the stop 12a, 12b.

Alternatively, the user may take the option of securing the slider 14 with a screw 33 instead of the padlock. This is not as high security as using a padlock as the user only requires a tool instead of a key to disengage, but can provide an installer with a quick way to lock the valve 1 temporarily to prevent tampering and accidental operation.

With a padlock absent, the slider 14 can be pushed through the slot 20 to the unlock position shown in FIG. 4, in which the engagement means 13 is arranged radially outwardly of the stops 12a, 12b, and rotation of the handle 7 between the open and closed positions of the valve 1 is possible. Pushing the grip 27 inwards also moves the grip 26 adjacent to the handle 7, moves the aperture 17 into the slot, so that it is no longer accessible, changes the part of the indicia 27 that is visible through the viewing window (to show the image of the padlock body and the unlocked hasp), and of course moves the projection 28 of the retaining means from the radially inner, first, depression 29, to the radially outer, second, depression 30, such that the movement from one position to the other can be clearly felt by the user.

Obviously, if desired, the slider 14 can be left in the unlock position and the handle 7 adjusted at will. However, if and when considered necessary, with the handle 7 in either the fully open or fully closed position (which are the only positions in which stops 12a, 12b are arranged in this embodiment), the grip 26 can be pulled outwards, moving the slider 14 to the lock position shown in FIG. 3 and discussed above. Of course, this is accompanied with a satisfying and positive tactile response as the projection 28 moves from the second depression 30 to the first, and in this position, a padlock (not shown) can be applied as discussed above.

The above embodiment is described by way of example only. Many variations are possible without departing from the scope of the invention as defined in the appended claims.

The invention claimed is:

1. A locking mechanism for a valve handle, the locking mechanism comprising a slider arranged to slide back and forth in a slot in the valve handle, between a lock position, in which the slider engages with a stop on a valve body and an unlock position, in which the slider does not engage with the stop; and further comprising a retention mechanism configured to retain the slider in the lock position and to retain the slider in the unlock position when the valve is in an open configuration and when the valve is in a closed configuration.

2. A locking mechanism according to claim 1 wherein the slider is arranged to slide through the slot and wherein on one side of the slot the slider comprises an engagement means, for engaging with the stop on the valve body.

3. A locking mechanism according to claim 2 wherein the slider comprises a padlock receiving means and/or a threaded, or partially threaded aperture at the opposite end of the slider from the engagement means, on the opposite side of the slot from the engagement means.

4. A locking mechanism according to claim 3 wherein the padlock receiving means and/or threaded or partially threaded aperture is arranged to be accessible when the slider is in the lock position and inaccessible when the slider is in the unlock position.

5. A locking mechanism according to claim 3 wherein the engagement means on the slider is sized and/or shaped such that it cannot be pulled through the slot.

6. A locking mechanism according to claim 1 wherein the retention mechanism comprises a resilient, or resiliently mounted, projection on the slider engageable with a corresponding depression in the handle or valve body.

7. A locking mechanism according to claim 1 wherein the valve handle has an elongate lever and the slot extends in the same longitudinal direction as the longitudinal axis of the lever; and wherein an engagement means is arranged on the same side of the slot as the elongate lever, whereas a grip and/or a padlock receiving means and/or a threaded or partially threaded aperture is arranged on the opposite side to the lever.

8. A valve having a valve body comprising one or more stops and a valve handle and comprising the locking mechanism according to claim 1.

9. A locking mechanism for a valve handle, the locking mechanism comprising a slider arranged to slide back and forth in a slot extending through the valve handle, between a lock position, in which the slider engages with a stop on a valve body and an unlock position, in which the slider does not engage with the stop;

wherein the handle is provided with a viewing window, through which a part of the slider in the slot can be viewed, wherein slider comprises a first part and a second part distinct from the first part, wherein a cutout is provided through the second part, wherein the upper surface of the first part is visible through the cutout.

10. A locking mechanism according to claim 9 wherein the slider is provided with indicia indicating whether it is in the lock or unlock position, whereby indicia indicating it is in a lock position is visible through the window when it is in the lock position and indicia indicating it is in the unlock lock position is visible through the window when it is in the unlock position.

11. A locking mechanism according to claim 10 wherein the indicia has a common part visible in both the lock and unlock position.

12. A locking mechanism for a valve handle, the locking mechanism comprising a slider arranged to slide back and forth in a slot in the valve handle, between a lock position, in which the slider engages with a stop on a valve body and an unlock position, in which the slider does not engage with the stop;

wherein the slot is arranged to extend through an attachment portion of the handle, where the handle is attached to the valve body by way of a fastener having a long axis, extending through a coaxial bore through the attachment portion and wherein the slot is arranged axially outwardly of the fastener, such that with the slider inserted, access to the fastener is prevented, and with the slider removed, access to the fastener through the co-axial bore is allowed.

\* \* \* \* \*